Figure 1:
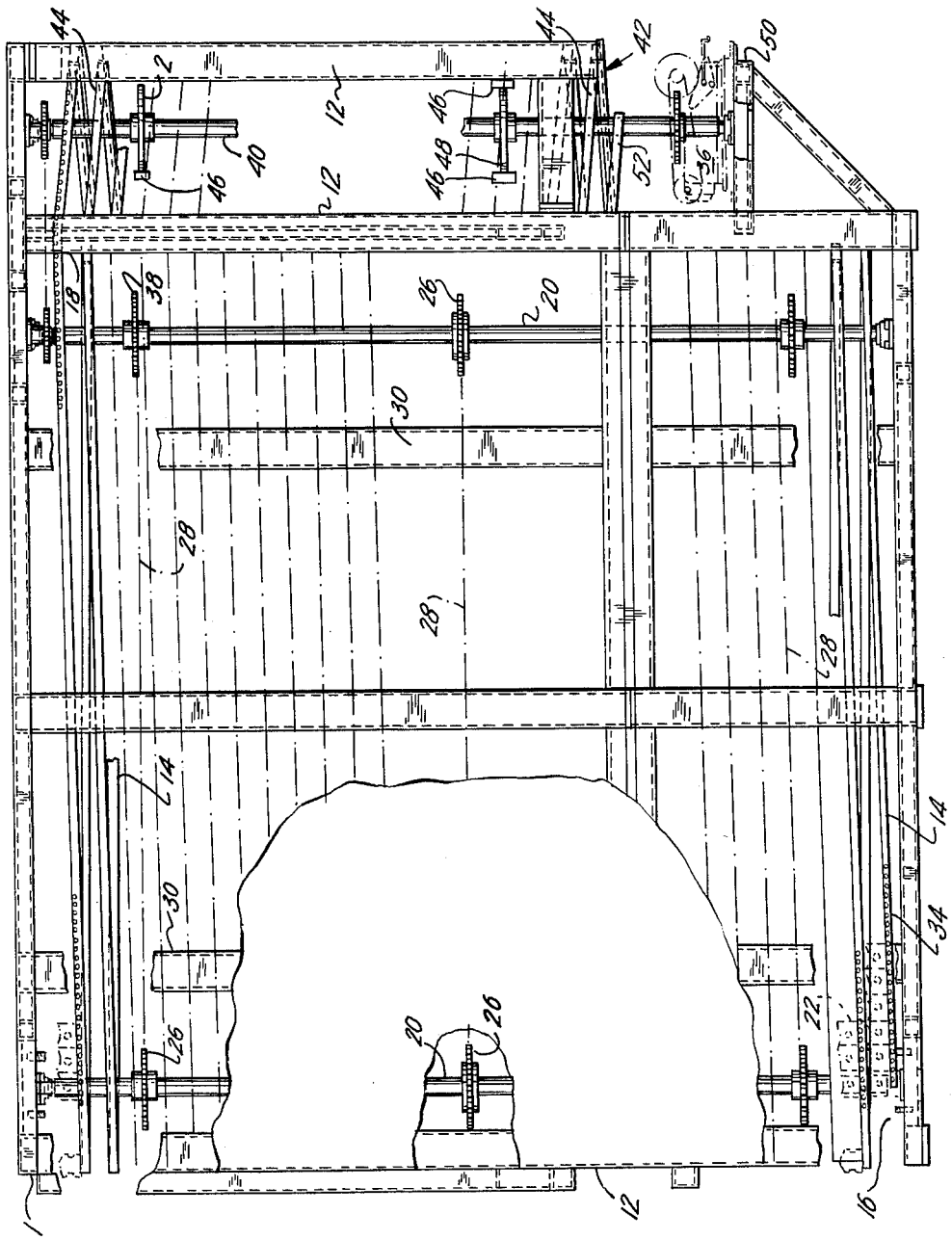

July 12, 1966        A. J. MARTIN        3,260,350

PARTS STORAGE AND HANDLING DEVICE

Filed Jan. 8, 1964        4 Sheets-Sheet 1

INVENTOR.
ANTHONY J. MARTIN
BY
ATTORNEYS

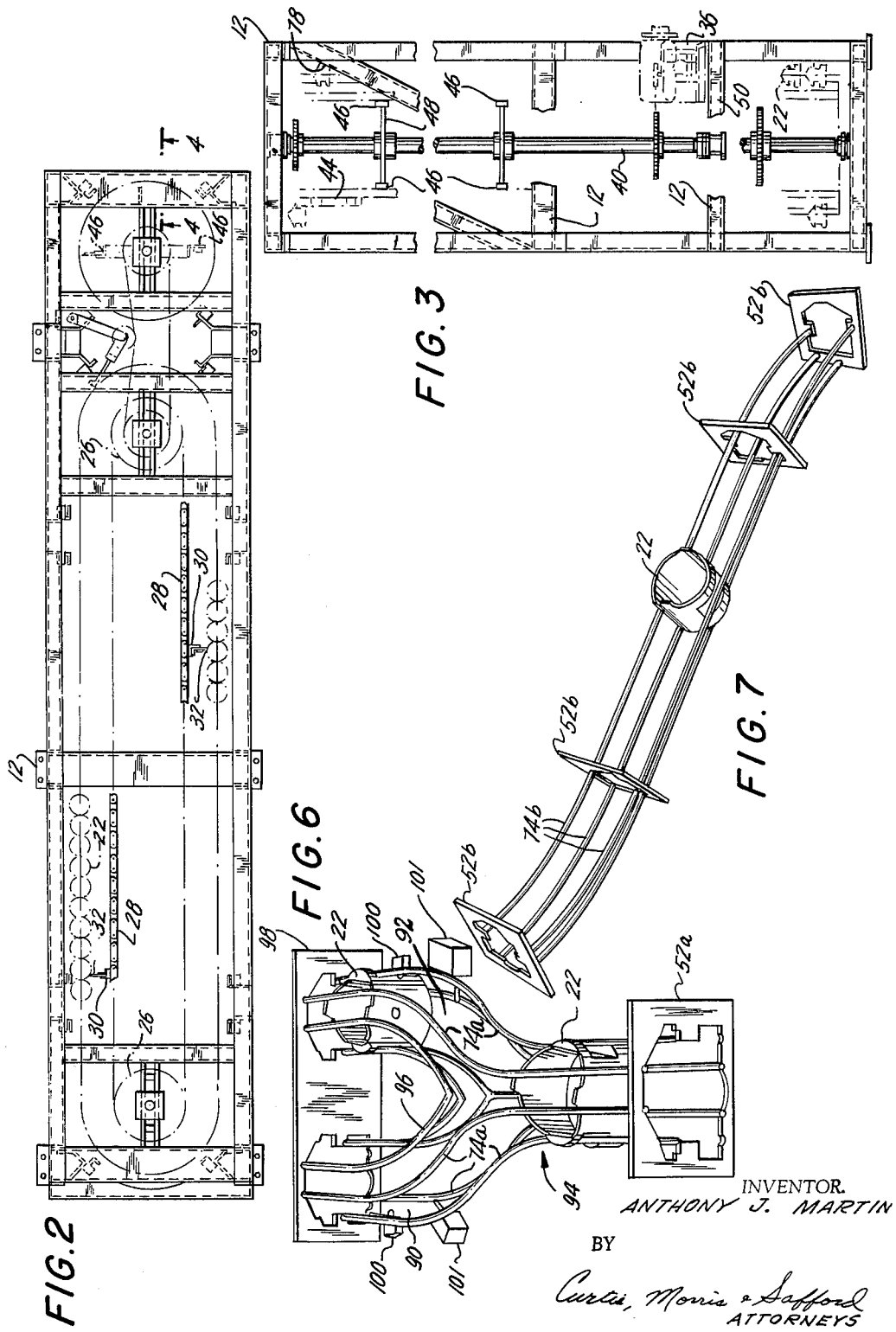

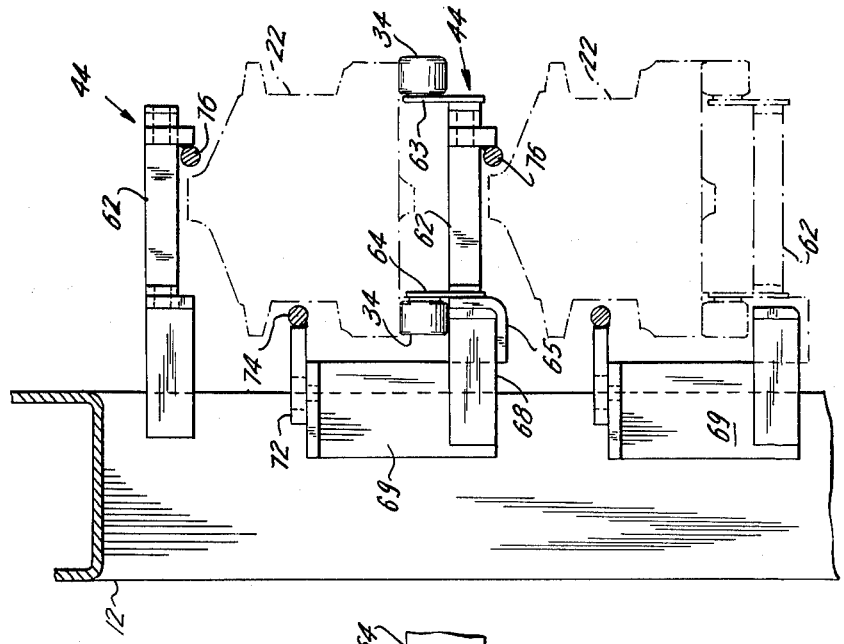
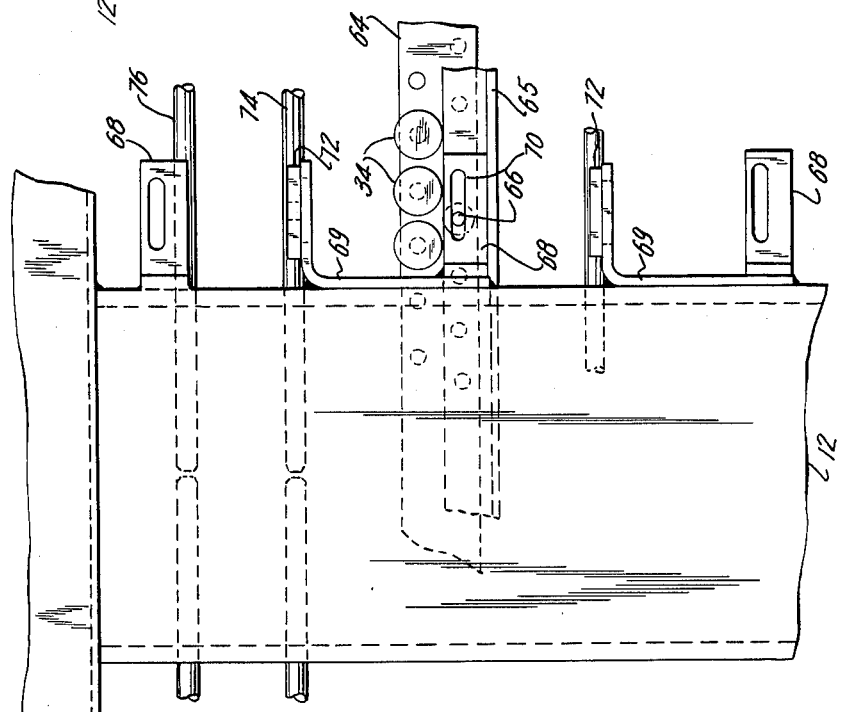

July 12, 1966 A. J. MARTIN 3,260,350
PARTS STORAGE AND HANDLING DEVICE
Filed Jan. 8, 1964 4 Sheets-Sheet 4
FIG. 8
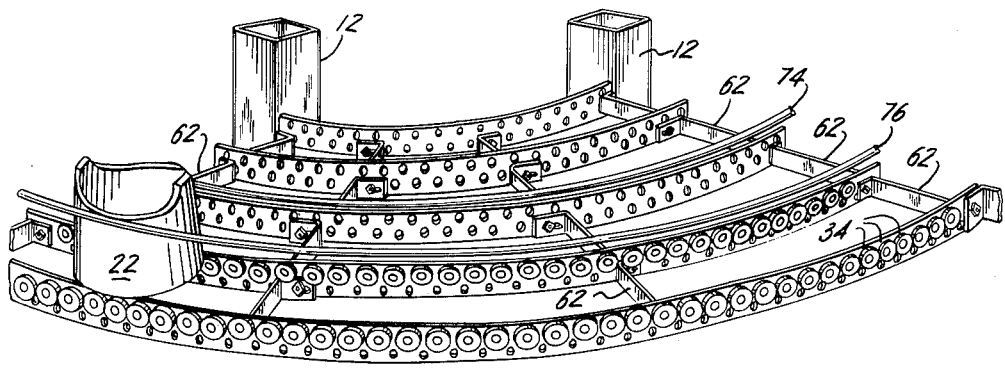
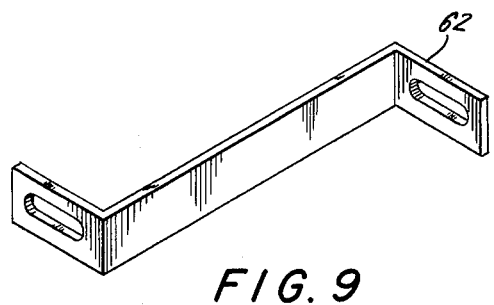
FIG. 9
INVENTOR.
ANTHONY J. MARTIN
BY
*Curtis, Morris & Safford*
ATTORNEYS _United States Patent Office_ 3,260,350
Patented July 12, 1966

3,260,350
PARTS STORAGE AND HANDLING DEVICE
Anthony J. Martin, Livonia, Mich., assignor to Ajem Laboratories, Inc., Livonia, Mich.
Filed Jan. 8, 1964, Ser. No. 336,494
9 Claims. (Cl. 198—136)

This invention relates to a storing and feeding device. More particularly, the invention relates to an article feeding and storage device comprising a storage section with an elevating section and article-propelling means.

Such devices are particularly useful in automated industrial operations where it is desirable to maintain a constant supply of parts for a given operation. By malfunction or by lack of attention, conventional conveyor systems sometimes interrupt the flow of parts so as to cause serious loss. In some conveyor operations, an entire sequence of assembly parts is lost if a single component part is missing from the feed; and the automated equipment would be unproductive for a full cycle each time one part is missed. The unit cost of production is thus materially increased. Furthermore, many machines, which are designed to balance when fully loaded, are damaged, or their operation impaired, if they are unbalanced by omitting a part.

Thus, it is desirable to provide means for assuring unfailing feed of the articles without regard to temporary interruptions in the supply. This is achieved with the present invention by providing storage of a ready reserve of parts for feed to the machines whenever a gap occurs in the normal progression of articles being fed.

In the present invention, applicant has provided apparatus which may be used in a variety of irregularly-shaped embodiments better adapted for full space utilization.

It is an object of the present invention to provide article-storage apparatus of compact design and large capacity. It is also an object of the invention to provide such apparatus wherein articles may be handled safely without mechanical abuse. Another object of the invention is to provide an article-propelling apparatus which may be varied in design for specific space requirements. It is a further object of the invention to provide an article-bearing conveyor. Another object of the invention is to provide new non-abrasive article-propelling means. Another object of the invention is to provide article-handling feeding and discharge devices. A further object of the invention is to provide means for merging the flow of articles into one line from a larger number of lines. A still further object of the invention is to provide a guide track for reducing the momentum of articles gravity fed through the guideway.

These objects have been achieved by a storage unit as herein described which combines an elevator and storage track with a guide, and a rotating conveyor for elevating articles from receiving position to a discharge position. Advantageously, the conveyor comprises horizontal chain-belts running on and driven by sprockets on the vertical support means and connected belt-to-belt by bars or other objects and carrying wipers, preferably of resilient material such as rubber or neoprene, which extend from the conveyor toward or over the guide track upon which articles are fed. Polyurethane wipers are advantageous because of resistance to solvent and abrasion. These wipers, being driven by frictional and positive engagement with the articles, urge them up the guide track. This contact provides a method of yieldably pushing the articles up the guide track and avoiding excessive pressure on any article. Articles received into the guide track are advantageously directed into and maintained in a desirable orientation by guide bars mounted along the track. It is to be understood that by varying the number of vertical supports around which the conveyor assembly moves, various non-circumgyrating storage apparatus such as triangular, rectangular, and kidney-shaped structures may be used, thus allowing a choice of design to fit the particular needs of the user. Circumgyratory configurations, i.e. those where the guide track forms a helix or spiral, of course, are also possible. The article-supporting guide track should be sufficiently close to the conveyor so that the wipers can reach the parts on the track and sweep them along.

The resilient wipers may be of any desired shape that allows sufficient contact with the parts to give the desired propelling effect.

The storing and feeding apparatus of the present invention may be enclosed, if desired, with an opaque or transparent housing. Depending on the kind of article being processed, the housing may advantageously provide not only for protecting against dirt and dust but may also provide means for isolating an enclosed atmosphere, e.g. for allowing temperature control, humidity control, or condensing corrosion inhibitors on the articles. The enclosure can also provide a shield for spray cleaning and drying operations often advantageous on such apparatus.

The primary storage and feeding device is advantageously coupled with a feed-out chute assembly which may be either a device for elevating parts or for lowering them depending upon the requirement of the particular plant layout. A particularly advantageous apparatus combines the storing and feeding device heretofore described with a novel feed-out chute comprising means for controlling the flow of articles, e.g. controlling the momentum with which parts are delivered from the chute outlet.

In this application and accompanying drawings, I have shown and described a preferred embodiment of my invention and have suggested various alternatives and modifications thereof, but it is to be understood that these are not intended to be exhaustive and that other changes and modifications can be made within the scope of the invention. These suggestions herein are selected and included for purposes of illustration in order that others skilled in the art will more fully understand the invention and the principles thereof and will be enabled to modify it and embody it in a variety of forms, each as may be best suited to the condition of a particular case.

In the drawings:
FIGURE 1 is a side elevational view of an article storing apparatus of the present invention, cut away to show an inclined track and article-propelling means.
FIGURE 2 is a plan view of the apparatus of FIGURE 1.
FIGURE 3 is an end elevational view of the apparatus of FIGURE 1, the view taken from the articles-discharge end.
FIGURE 4 is a fragmentary view of track in vertical section taken on line 4—4 of FIGURE 2.
FIGURE 5 is a fragmentary elevational side view of the conveyor lines wth the frame of the apparatus cut away, taken from the left side of FIGURE 4.
FIGURE 6 is a perspective view of a novel parts collecting device useful with the apparatus of the present invention.
FIGURE 7 is a perspective view of a guideway advantageously used with the apparatus of the instant invention and especially useful to control momentum of articles gravity fed through it.
FIGURE 8 is a view of a conveyor segment utilizing the novel guideways of the instant invention.
FIGURE 9 is a perspective view of a slotted brace useful in construction of a guide path.
Referring to FIGURE 1, a frame 12 has attached to it sloping guide track 14 (shown only a fragment at the top and a fragment at the bottom with the central part broken away to avoid confusion with other parts). This track 14 provides a passage for articles from inlet 16 at the bottom left to outlet 18 at the top right. Vertical axles 20 are rotatably mounted on frame 12 top and bottom. Articles 22 (automobile pistons in the illustrated case) are fed to track 14 through inlet 16 onto a feed track 14.

Axles 20 are provided with sprocket wheels 26 around which conveyor loop chains 28 rotate (see FIGURE 2). Attached to chains 28 are vertical bars or slats 30 forming a continuous-belt conveyor and having, as seen in FIGURE 2, flexible wipers 32 attached. Articles, for instance the pistons mentioned above, are pushed along track 14, and their travel is facilitated by rollers 34.

The conveyor is powered by motor 36 which transmits power to a sprocket wheel 38 on axle 20 via axle 40 of feed-out chute 42.

After articles 22 have been pushed up track 14 and through and beyond outlet 18, they roll or slide down the helical feed-down track 44.

Resilient blades 46 carried by wheels or arms 48 on shaft 40 protrude a sufficient distance to contact articles 22 as they descend the chute. The contact is sufficient to control feed-down; for example stuck parts will be urged forward and therefore downward by blades 46, and articles tending to roll too swiftly will be slowed down by blades 46. Motor 36 and main shaft 40, mounted on platform 50, drive the blade assembly. On reaching the bottom of the down track 44, the articles 22 are exited at 52.

In FIGURES 4 and 5, two flights of the spiral track 14 are shown. Pistons 22 rest on rollers 34, which are rotatably mounted on outside rail 63 and inside side rail 64, respectively, which are in turn mounted by bolts 66 on adjustable angle supports 65, and slotted braces 62 (shown in perspective in FIGURE 9) are secured to track wall bracket 68. Slots 70 provide for adjusting the position of bolts 66 and supports 65.

Referring to FIGURES 4 and 5, a support member 69 has a bracket 72 at its top holding a guide bar 74. Another guide bar 76 is mounted beneath slotted brace 62. These guide bars are suitably placed to maintain the articles on the predetermined path while they are being moved; e.g. as illustrated, the pistons 22 are kept in an erect position.

The side rail 64, due to its slidable attachment, can be used for straight tracks or curved tracks. Adjustable angle supports 65 are adapted to hold the side rail 64 in adjusted position. Slotted braces 62 hold the outside side rails 63 in proper position. The aforementioned guidance and roller system provides a non-jamming, conveyor system to promote the smooth trouble-free conveyance of parts through the apparatus.

The guide track for the articles handled in the apparatus may be along hardened steel ways or guide rods. Advantageously, as shown, it comprises rollers which are set on two lengths of flexible metal ribbon, for example tempered steel strapping, connected by a brace having slots through which the strapping, the brace and an angular adjustment support, which is on the outside of the steel strapping and is also slotted, are adjustably connected together and fastened to a support and thence to the frame of the feeding and storage apparatus.

Rollers are mounted on the steel ribbon at such a height that their upper surfaces protrude above the ribbon and provide a low-friction surface for articles traveling along the guidepath. Furthermore, guide bars are suitably mounted on the guidepath assembly to retain articles in properly oriented position. Guidepaths utilizing steel strapping are easily adjustable and adapt to irregular and curved configurations. It will be readily understood that these novel guidepaths may be assembled into separate conveyor systems as shown in FIGURE 8, for example.

An advantageous embodiment of the invention has the side rail 64 comprised of perforated steel strip, for example of blue tempered steel. The perforations are sized and spaced to accommodate the axles of rollers 34. By slotting the adjustable angle supports 65 and slotted brace 62, any required height relationship may be achieved between the two roller supports, i.e. inside rail 64 and outside adjustable guide rails 63. This is important for handling some articles, and is often especially helpful at the curved sections of the track. This adjustable feature incorporating the steel strip not only simplifies the production of the apparatus but also makes easy the adjustments and corrections in the alignment of the rollers or angle between rollers.

It is sometimes desirable that parts from several storage or processing units be fed into a single line from a number of different lines. A device useful for this purpose is shown in FIGURE 6 where conveyor path 90 and conveyor path 92 come together at 94 in a Y-shaped collector. Guide rods 74a are attached between front exit gate 52a and rear gate 98. Articles 22 feeding along paths 90 alone or 92 alone may proceed into collector 94, but when articles try to enter simultaneously, a limit switch 100 actuates a stop mechanism 101 and allows only one part at a time to enter the collector. This equipment is useful in a method for storage and feed or as a method for channeling the output of several apparatus into a single conveyor channel. Multiple devices are also useful; for example, three such devices, one in tandem with the other two, can be used to channel the output of four conveyor paths into a single path.

Another device embodying the present invention useful for storage and feed is shown in FIGURE 7. This conveying guide has guide bars 74b flexible enough to be bent to a considerable extent. Thus a straight or smoothly curved guide may be bent to offer the desired amount of frictional resistance to gravity flow and thus provide for delivery of articles at a given height without the danger of too great momentum which would require a severe braking action on the article at the point of delivery. Several gate members 52b are used to serve as spacers for the bars 74b.

FIGURE 8 shows a conveyor section comprising the kind of track used in the storage apparatus described. Conveyor sections are novel, adaptable and advantageous for expeditious and safe handling of articles.

I claim:

1. A storage and feeding apparatus for articles comprising an inlet thereto, an outlet therefrom, a guide track for supporting articles, said track forming a passage between said inlet and said outlet, a frame, on the inner periphery of which said track is mounted, an article-propelling means carried by said frame comprising at least two vertical support means and a continuous conveyor loop rotatably mounted thereon and wipers forming article-contacting means for urging articles along said track, said wipers being attached to said conveyor loop, means for actuating said conveyor, a guide track comprising a frame, two lengths of perforated flexible metal strip including an outer strip and an inner strip, a slotted brace connecting said metal strips, rollers rotatably mounted on said strips, respectively, with the uppermost circumferential part of said rollers rising above the strips to provide a low-friction rolling surface for said guideway, adjustable angle supports having slots for accommodating adjustment, mounted on said frame and connected to said outer strip and said slotted brace by fastening means passing through said slots of said adjustable angle support and said brace, and having a perforation in said outer strip, and fastening means attaching said inner strip to said slotted brace.

2. A storage and feeding apparatus for articles comprising an inlet thereto, an outlet therefrom, a guide track for supporting articles, said track forming a passage between said inlet and said outlet, a frame, on which said track is mounted, article-propelling means carried by said frame and at least two vertical support means and a continuous loop conveyor rotatably mounted thereon and wipers forming article-contacting means for urging articles along said track, said wipers being attached to said conveyor, means for actuating said conveyor, a feed-out chute comprising a spiral sloping track for articles, a frame supporting said track, a vertical shaft rotatably mounted axially within said spiral, means for rotating said shaft, and blades secured at a substantial radius from said shaft for controlling speed of articles on said track.

3. A storage and feeding apparatus for articles comprising an inlet thereto, an outlet therefrom, a guide track for supporting articles said track forming a passage between said inlet and said outlet, a frame on which said track is mounted, an article-propelling means enclosed by said frame and comprising at least two vertical support means and a continuous loop conveyor rotatably mounted thereon and article-contacting means for urging articles along said track said article-contacting means being attached to said conveyor, means for actuating said conveyor, a feed-out chute comprising a spiral sloping track for carrying articles, a frame supporting said track, a vertical shaft rotatably mounted axially within said spiral, means for rotating said shaft, blades radially spaced beyond said shaft for controlling speed of articles on said track, said spiral sloping track comprising a frame, two lengths of perforated flexible metal strip including an outer strip and an inner strip, a slotted brace connecting said strips, rollers rotatably mounted on each strip with the peripheries of said rollers extending above the strips to provide a low-friction rolling surface for said track, adjustable angle supports having slots said adjustable angle supports being mounted on said frame and connected to said outer strip and said slotted brace by fastening means passing through the slots of said adjustable angle support and said brace and a perforation in said outer strip, and fastening means for attaching said inner strip to said slotted brace.

4. A feed-out chute apparatus comprising a spiral sloping track for carrying articles, a frame supporting said track, a vertical shaft rotatably mounted axially within said spiral, means for rotating said shaft, means for controlling speed of articles on said track formed of blades radially spaced beyond said shaft, said spiral sloping track comprising, two lengths of perforated flexible metal strips including an outer strip and an inner strip, a slotted brace connecting said metal strips, rollers rotatably mounted along each of said strips to provide a low-friction rolling surface for said guideway, adjustable angle supports having slots, said adjustable angle support being mounted on said frame and connected to one of said strips.

5. A track to aid the transport of articles on a conveyor said track comprising a frame, two lengths of perforated flexible metal strips including an outer strip and an inner strip, a slotted brace connecting said metal strips, rollers rotatably mounted on each said strip with the peripheries of said rollers extending beyond the strips to provide a low-friction rolling surface, adjustable angle supports having slots, said adjustable angle support being mounted on said frame and connected to said outer strip and said slotted brace by fastening means passing through the slots of said adjustable angle support and said brace and perforations in said outer strip, and fastening means for attaching said inner strip to said slotted base.

6. A track as in claim 5 where said perforated flexible metal strips are tempered steel strips.

7. A conveyor comprising the track of claim 5.

8. A track to aid the transport of articles on a conveyor said track comprising a frame, two lengths of perforated flexible steel strips including an inner strip and an outer strip, a slotted brace connecting said strip with the peripheries of said rollers extending beyond the strips to provide a low-friction rolling surface for said track, an adjustable angle support having slots, said adjustable angle support being mounted on said frame and connected to said outer strip and said slotted brace by fastening means passing through slots of said adjustable angle support and said brace and perforations of said outer strip, fastening means attaching said inner strip to said slotted brace, a slotted support member placed between said brace and said outer strip, a guide bar mounted below said strip providing means for guiding articles on a lower track section and a guide bar mounted on said frame by support means to provide position guidance of articles.

9. A guideway to aid the transport of articles on a conveyor comprising a frame, a length of a perforated flexible metal strip, rollers rotatably mounted on said strip to provide a low-friction rolling surface for said guideway, adjustable angle supports having slots, said adjustable angle supports being mounted on said frame and connected to said strip by fastening means fastened through the slots of said adjustable angle supports and perforations in said strip, guide bars mounted to said frame to parallel said strip and mounted in a position to retain the articles on the track formed on the strip and rollers, whereby said guideway is readily adaptable to be mounted along any curved pathway and to be adjusted therealong for smooth operation.

References Cited by the Examiner

UNITED STATES PATENTS

| | | | |
|---|---|---|---|
| 1,380,626 | 6/1921 | Ayars | 198—159 |
| 1,856,733 | 5/1932 | Shepherd | 198—19 X |
| 1,892,206 | 12/1932 | Dietz | 198—212 |
| 2,956,697 | 10/1960 | Madden | 214—8.5 |
| 2,978,092 | 4/1961 | Phillips | 198—32 |
| 3,071,240 | 1/1963 | Graham | 198—171 X |
| 3,144,119 | 8/1964 | Nigrelli | 198—32 |

EVON C. BLUNK, *Primary Examiner.*

WILLIAM B. LABORDE, SAMUEL F. COLEMAN,
*Examiners.*

E. A. SROKA, *Assistant Examiner.*